(12) United States Patent
Yeh

(10) Patent No.: US 9,565,282 B2
(45) Date of Patent: Feb. 7, 2017

(54) COMMUNICATION DEVICE AND QUICK DIALING METHOD

(71) Applicant: FIH (HONG KONG) LIMITED, Kowloon (HK)

(72) Inventor: Wang-Hung Yeh, New Taipei (TW)

(73) Assignee: FIH (HONG KONG) LIMITED, Kowloon (HK)

( * ) Notice: Subject to any disclaimer, the term of this patent is extended or adjusted under 35 U.S.C. 154(b) by 0 days.

(21) Appl. No.: 14/725,840

(22) Filed: May 29, 2015

(65) Prior Publication Data
US 2016/0165028 A1    Jun. 9, 2016

(30) Foreign Application Priority Data

Dec. 3, 2014   (CN) .......................... 2014 1 0727924

(51) Int. Cl.
| H04M 3/42 | (2006.01) |
| H04M 1/2745 | (2006.01) |
| H04M 1/725 | (2006.01) |
| H04W 4/16 | (2009.01) |

(52) U.S. Cl.
CPC ...... *H04M 1/27455* (2013.01); *H04M 1/72583* (2013.01); *H04W 4/16* (2013.01); *H04M 2001/274541* (2013.01)

(58) Field of Classification Search
CPC ........ G06F 3/0488; H04M 3/563; H04W 4/16
USPC ...... 455/404.1, 411, 415, 566, 414.1, 553.1; 345/173, 174, 441, 178
See application file for complete search history.

(56) References Cited

U.S. PATENT DOCUMENTS

| 5,638,438 A * | 6/1997 | Keen .................. G06F 3/04886 379/354 |
| 2010/0001967 A1* | 1/2010 | Yoo ...................... G06F 3/0488 345/173 |

* cited by examiner

*Primary Examiner* — Kiet Doan
(74) *Attorney, Agent, or Firm* — Zhigang Ma

(57) ABSTRACT

A quick dialing method executable on a communication device includes detecting an action by a user on a touch screen of the communication device; dialing a selected quick contact when the detected action is a preselected triggering action.

9 Claims, 5 Drawing Sheets

COMMUNICATION DEVICE AND QUICK DIALING METHOD

CROSS-REFERENCE TO RELATED APPLICATIONS

This application claims priority to Chinese Patent Application No. 201410727924.1 filed on Dec. 3, 2014, the contents of which are incorporated by reference herein.

FIELD

The subject matter herein generally relates to communication technology, and particularly to a communication device and a quick dialing method.

BACKGROUND

When a user wants to make a phone call to a contact using a communication device (e.g., a smart phone or a tablet computer), the user has to open a contact list (e.g., a phone book) first, and then select the contact.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
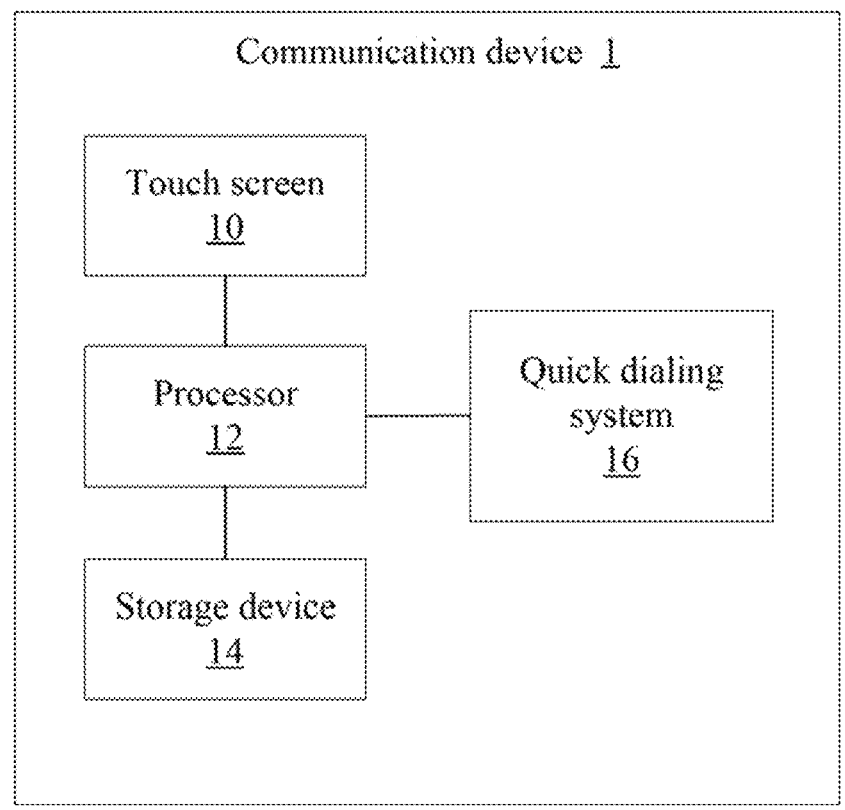
FIG. 1 is a block diagram of one embodiment of a communication device including a quick dialing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series and the like.

FIG. 1 is a block diagram of one embodiment of a communication device including a quick dialing system. In at least one embodiment as shown in FIG. 1, a quick dialing system 16 is installed and run in a communication device 1. The communication device 1 includes, but is not limited to, a touch screen 10, at least one processor 12, and a storage device 14. The communication device 1 can be a smart phone, a tablet computer, a wearable device, or any other communication device. FIG. 1 illustrates only one example of the communication device 1 that can include more or fewer components than illustrated, or have a different configuration of the various components in other embodiments.

In at least one embodiment, the touch screen 10 can be a touch screen, which support multi-touch, such as resistive touch screens or capacitive touch screens. In some embodiments, the touch screen 10 can provide a human-computer interaction interface, which can display different kinds of application interfaces (e.g., a lock screen interface, a main menu and various functions interface), and can receive operational commands input by a user. In at least one embodiment, there is an unlocking area on the touch screen 10 when the touch screen 10 is locked.

In at least one embodiment, the at least one processor 12 can be a central processing unit (CPU), a microprocessor, or other data processor chip that performs function of the quick dialing system 16 in the communication device 1.

In at least one embodiment, the storage device 14 can include various types of non-transitory computer-readable storage medium. For example, the storage device 14 can be an internal storage system, such as a flash memory, a random access memory (RAM) for temporary storage of information, and/or a read-only memory (ROM) for permanent storage of information. The storage device 14 can also be an external storage system, such as a hard disk, a storage card, or a data storage medium. The storage device 14 stores a phone book which have more than one contact phone number and/or other information.

The quick dialing system 16 can execute a quick dialing function to make a phone call to a selected contact.

Figure 2:
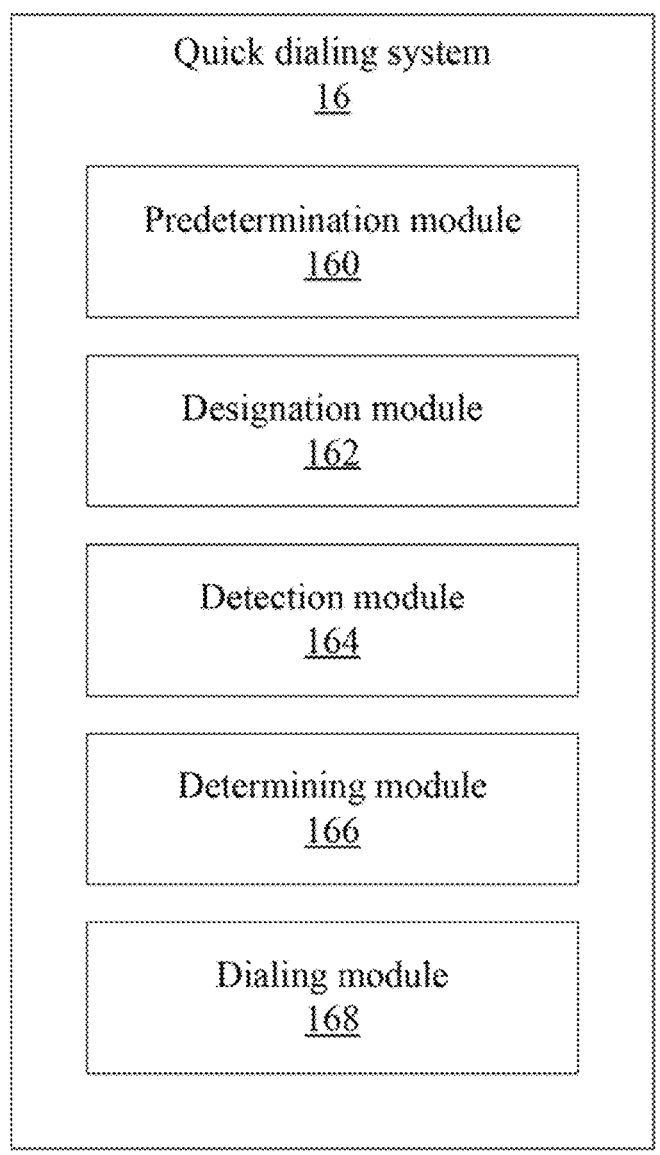
FIG. 2 is a block diagram of one embodiment of function modules of the quick dialing system in the communication device in FIG. 1.

FIG. 2 is a block diagram of one embodiment of function modules of the quick dialing system in FIG. 1. In at least one embodiment, the quick dialing system 16 can include a predetermination module 160, a designation module 162, a detection module 164, a determining module 166, and a dialing module 168. The function modules 160, 162, 164, 166, and 168 can include computerized codes in the form of one or more programs, which are stored in the storage device 14 of the communication device 1. The at least one processor 12 executes the computerized codes to provide functions as described below.

The predetermination module 160 can predetermine a triggering action of the communication device 1.

Figure 3:
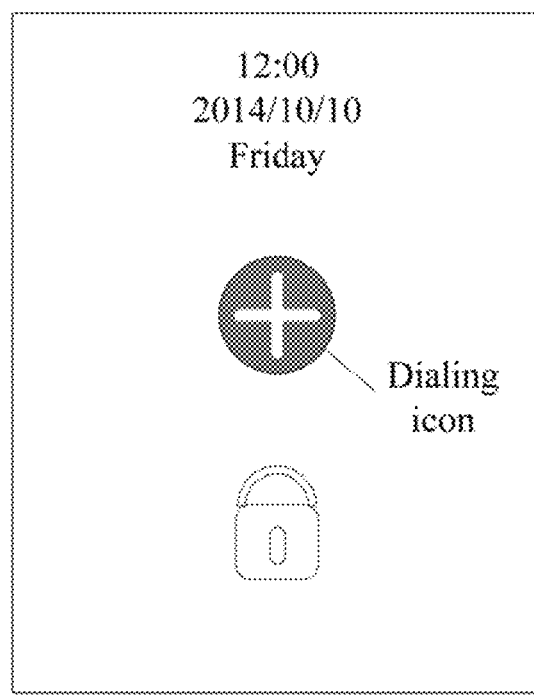
FIG. 3 illustrates a diagrammatic viewing of one embodiment of a dialing icon on a touch screen of the communication device when the touch screen is locked.

In at least one embodiment, the predetermination module 160 can predetermine a dialing icon which can be displayed within an area beyond an unlocking area of the touch screen 10 when the touch screen 10 is locked, as shown in FIG. 3.

In at least one embodiment, the predetermined triggering action can be the predetermined dialing icon being pressed throughout a predetermined time duration (e.g., five seconds).

The designation module 162 can preselect quick contacts. In some embodiments, the preselected quick contacts can be selected by a user from the phone book which is stored in the storage device 14 of the communication device 1.

The detection module 164 can detect actions input by the user on the touch screen 10 when the touch screen 10 is locked.

The determining module 166 can determine whether the detected action is a predetermined triggering action. If the predetermined dialing icon is pressed throughout the predetermined time duration, the detected action is determined to be the preselected triggering action, the dialing module 168 can dial a selected quick contact.

In some embodiments, if there is a single quick contact can be preselected, thus when the detected action is determined to be the preselected triggering action, the dialing module 168 dials the quick contact. In another embodiment, more than one quick contact can be preselected, when the detected action is determined to be the preselected triggering action, all the quick contacts are displayed on the touch screen 10. Then, when one of the quick contacts is selected, the dialing module 168 dials the selected quick contact.

Figure 4:
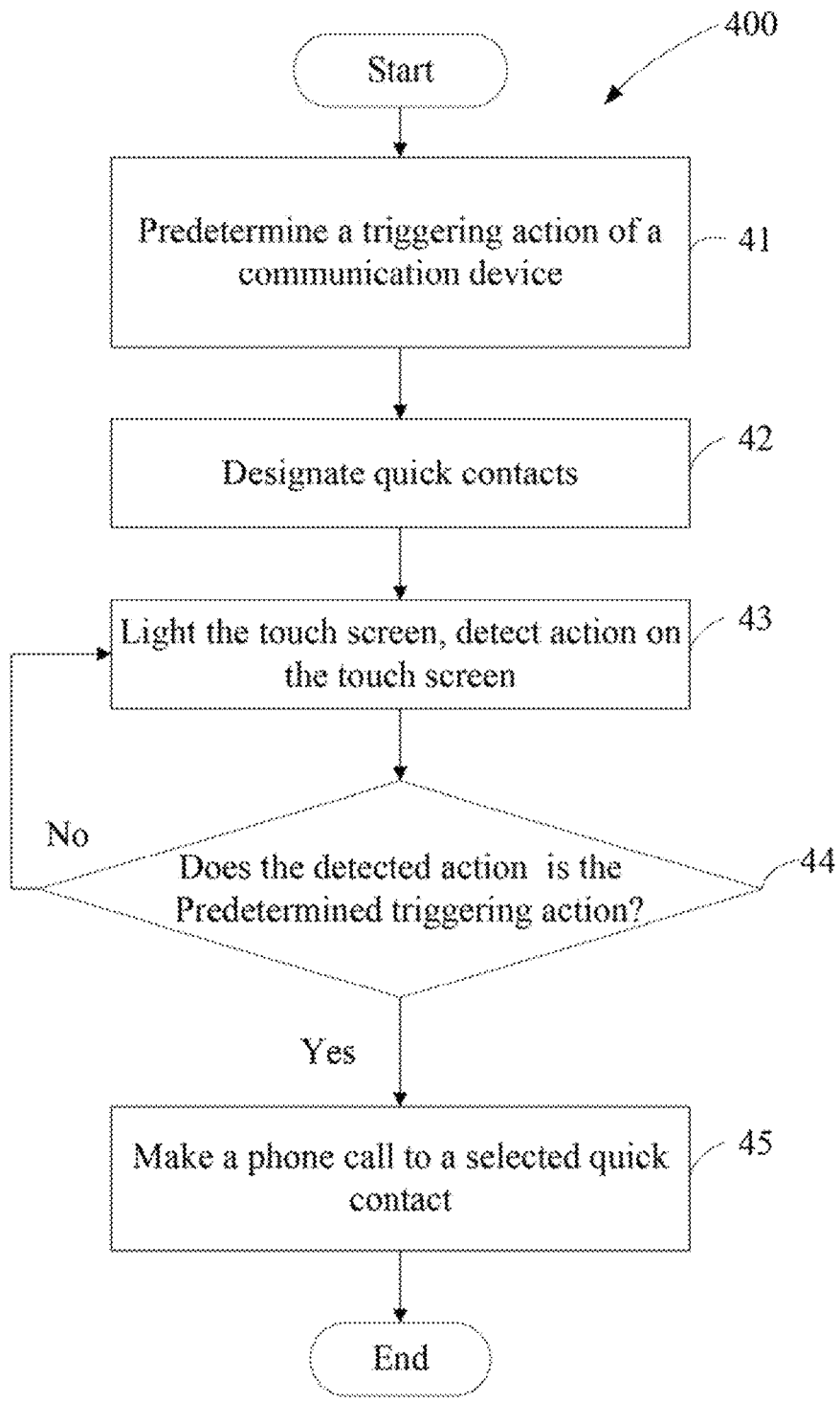
FIG. 4 is a flowchart of one embodiment of a method for quick dialing with the communication device in FIG. 1.

Referring to FIG. 4, a flowchart is presented in accordance with an example embodiment. The example method 400 is provided by way of example, as there are a variety of ways to carry out the method. The example method 400 described below can be carried out using the configurations illustrated in FIG. 1 and FIG. 2, for example, and various elements of these figures are referenced in explaining example method 400. Each block shown in FIG. 4 represents one or more processes, methods, or subroutines, carried out in the example method. Furthermore, the illustrated order of blocks is by example only and the order of the blocks can be changed. The example method 400 can begin at block 41. Depending on the embodiment, additional blocks can be added, others removed, and the ordering of the blocks can be changed.

At block 41, a predetermination module predetermines a triggering action of the communication device 1.

At block 42, a designate module preselects quick contacts. The quick contacts can be selected by a user from a phone book stored in a storage device 14.

At block 43, a detection module detects actions on the touch screen 10 when the touch screen 10 is light. In some embodiments, lighting the touch screen 10 by pressing a virtual key throughout a predetermined time duration (e.g., three seconds).

At block 44, a determining module determines whether the detected action is the predetermined triggering action, when the touch screen 10 is locked based on detected action. If the dialing icon is pressed throughout the predetermined time duration, the detected action is determined to be the preselected triggering action, the procedure goes to block 45. If the dialing icon is pressed less than the predetermined time duration, the detected action is not determined to be the preselected triggering action, the procedure returns to block 43.

Figure 5:
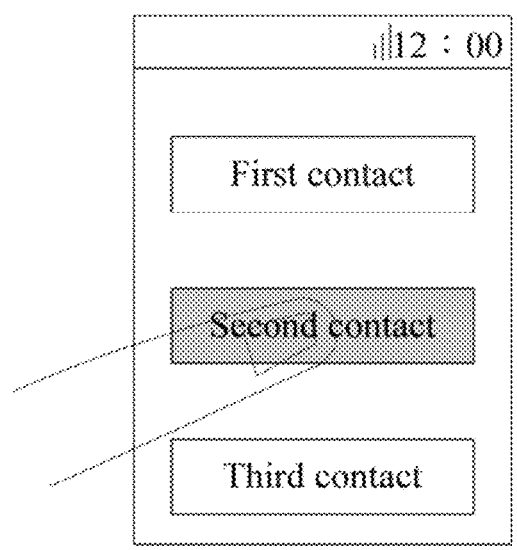
FIG. 5 illustrates a diagrammatic viewing of one embodiment of a selected quick contact when the touch screen is locked.

At block 45, a dialing module dials a selected quick contact. As shown in FIG. 5, the user of the communication device 1 has preselected three quick contacts, a first contact, a second contact, and a third contact. When the dialing icon is pressed throughout five seconds, the three quick contacts are displayed on the touch screen 10, and the dialing module makes a phone call after the user has select the second contact shown in FIG. 5.

It should be emphasized that the above-described embodiments of the present disclosure, including any particular embodiments, are merely possible examples of implementations, set forth for a clear understanding of the principles of the disclosure. Many variations and modifications can be made to the above-described embodiment(s) of the disclosure without departing substantially from the spirit and principles of the disclosure. All such modifications and variations are intended to be included herein within the scope of this disclosure and protected by the following claims.

What is claimed is:

1. A quick dialing method executable on a communication device, the communication device comprising at least one processor, and a storage device for storing one or more non-transitory computer-readable programs, the method comprising:
   predetermining a dialing icon displaced within an area beyond an unlocking area of the touch screen of the communication device when the touch screen is locked;
   preselecting quick contacts on the dialing icon;
   detecting an action by a user on the dialing icon of the communication device when the touch screen is locked;
   determining, using the at least one processor, whether the detected action is a predetermined triggering action; and
   dialing a selected quick contact when the detected action is a preselected triggering action;
   wherein the predetermined triggering action is the predetermined dialing icon being pressed throughout a predetermined time duration.

2. The method according to claim 1, further comprising:
   displaying a plurality of preselected quick contacts before dialing a phone call to a selected quick contact, when the detected action is determined to be the preselected triggering action;
   receiving the user selected quick contact; and
   dialing the selected quick contact.

3. The method according to claim 1, wherein the preselected quick contacts are selected from a phone book stored in the storage device of the communication device.

4. A communication device, comprising:
   a touch screen;
   at least one processor; and
   a storage device that stores one or more programs which, when executed by the at least one processor, cause the at least one processor to:
   predetermine a dialing icon displaced within an area beyond an unlocking area of the touch screen of the communication device when the touch screen is locked;
   preselect quick contacts on the dialing icon;
   detect an action by a user on the dialing icon of the communication device when the touch screen is locked;
   determine, using the at least one processor, whether the detected action is a predetermined triggering action; and dial a selected quick contact when the detected action is a preselected triggering action;

wherein the predetermined triggering action is the predetermined dialing icon being pressed throughout a predetermined time duration.

5. The communication device according to claim 4, further comprising:

display a plurality of preselected quick contacts before dialing a phone call to a selected quick contact, when the detected action is determined to be the preselected triggering action;

receive the user selected quick contact; and dial the selected quick contact.

6. The communication device according to claim 4, wherein the preselected quick contacts are selected from a phone book stored in the storage device of the communication device.

7. A non-transitory storage medium having stored thereon instructions that, when executed by at least one processor of a communication device, causes the at least one processor to perform a method for quick dialing, the communication device comprising a touch screen, wherein the method comprises:

predetermining a dialing icon displaced within an area beyond an unlocking area of the touch screen of the communication device when the touch screen is locked:

preselecting quick contacts on the dialing icon;

detecting an action by a user on the dialing icon of the communication device when the touch screen is locked;

determining, using the at least one processor, whether the detected action is a predetermined triggering action; and dialing a selected quick contact when the detected action is a preselected triggering action;

wherein the predetermined triggering action is the predetermined dialing icon being pressed throughout a predetermined time duration.

8. The non-transitory storage medium according to claim 7, further comprising:

displaying a plurality of preselected quick contacts before dialing a phone call to a selected quick contact, when the detected action is determined to be the preselected triggering action;

receiving the user selected quick contact; and dialing the selected quick contact.

9. The non-transitory storage medium according to claim 7, wherein the preselected quick contacts are selected from a phone book stored in the storage device of the communication device.

* * * * *